US008114947B2

(12) United States Patent
Jialanella et al.

(10) Patent No.: US 8,114,947 B2
(45) Date of Patent: Feb. 14, 2012

(54) ACCELERATED ORGANOBORANE AMINE COMPLEX INITIATED POLYMERIZABLE COMPOSITIONS

(75) Inventors: Gary L. Jialanella, Oxford, MI (US); Dean A. Johnson, North Branch, MI (US)

(73) Assignee: Dow Global Technologies LLC, Midland, MI (US)

( * ) Notice: Subject to any disclaimer, the term of this patent is extended or adjusted under 35 U.S.C. 154(b) by 489 days.

(21) Appl. No.: 11/861,616

(22) Filed: Sep. 26, 2007

(65) Prior Publication Data
US 2008/0045681 A1 Feb. 21, 2008

Related U.S. Application Data

(62) Division of application No. 11/019,056, filed on Dec. 21, 2004, now Pat. No. 7,534,843.

(60) Provisional application No. 60/532,066, filed on Dec. 22, 2003.

(51) Int. Cl.
C08F 4/52 (2006.01)
C08F 4/54 (2006.01)
C08F 2/00 (2006.01)
B32B 7/12 (2006.01)

(52) U.S. Cl. ............ 526/198; 526/208; 427/385.5; 156/327

(58) Field of Classification Search .......... 526/198, 526/208; 427/385.5; 156/327
See application file for complete search history.

(56) References Cited

U.S. PATENT DOCUMENTS

| | | | |
|---|---|---|---|
| 3,236,823 A | 2/1966 | Leverkusen et al. |
| 3,275,611 A | 9/1966 | Mottus et al. |
| 3,527,737 A | 9/1970 | Masuhara et al. |
| 3,819,447 A | 6/1974 | Dailibor et al. |
| 3,971,751 A | 7/1976 | Isayama et al. |
| 4,344,800 A | 8/1982 | Lutz |
| 4,385,153 A | 5/1983 | Ritter |
| 4,426,243 A | 1/1984 | Briggs |
| 4,448,927 A | 5/1984 | Faloener et al. |
| 4,515,724 A | 5/1985 | Ritter |
| 4,538,920 A | 9/1985 | Drake |
| 4,552,604 A | 11/1985 | Green |
| 4,676,858 A | 6/1987 | Ritter |
| 4,705,838 A | 11/1987 | Goel |
| 4,746,725 A | 5/1988 | Evans et al. |
| 4,788,254 A | 11/1988 | Kawakubo et al. |
| 4,823,927 A | 4/1989 | Jensen |
| 4,920,188 A | 4/1990 | Sakashita |
| 4,921,921 A | 5/1990 | Ritter |
| 4,985,477 A | 1/1991 | Collins et al. |
| 4,985,516 A | 1/1991 | Sakashita et al. |
| 5,034,464 A | 7/1991 | Arduengo |
| 5,079,098 A | 1/1992 | Liu |
| 5,082,147 A | 1/1992 | Jacobs |
| 5,106,928 A | 4/1992 | Skoultchi et al. |
| 5,126,416 A | 6/1992 | Yang |
| 5,132,377 A | 7/1992 | Nakano et al. |
| 5,143,884 A | 9/1992 | Skoultchi et al. |
| 5,204,386 A | 4/1993 | Ersun-Hallsby et al. |
| 5,223,597 A | 6/1993 | Iwakiri et al. |
| 5,250,228 A | 10/1993 | Baigrie et al. |
| 5,286,821 A | 2/1994 | Skoultchi |
| 5,308,895 A | 5/1994 | Gan et al. |
| 5,310,835 A | 5/1994 | Skoultchi et al. |
| 5,344,890 A | 9/1994 | Miyazono et al. |
| 5,376,746 A | 12/1994 | Skoultchi |
| 5,401,805 A | 3/1995 | Chung et al. |
| 5,404,805 A | 4/1995 | Fujimoto et al. |
| 5,409,995 A | 4/1995 | Iwahara et al. |
| 5,411,998 A | 5/1995 | McArdle et al. |
| 5,420,223 A | 5/1995 | Johnson |
| RE35,058 E | 10/1995 | Yang |
| 5,506,326 A | 4/1996 | Kneafsey |
| 5,539,070 A | 7/1996 | Zharov et al. |
| 5,567,833 A | 10/1996 | Iwahara et al. |
| 5,599,856 A | 2/1997 | Gardner |
| 5,616,796 A | 4/1997 | Pocius |
| 5,621,143 A | 4/1997 | Pocius |
| 5,674,941 A | 10/1997 | Cho et al. |
| 5,679,458 A | 10/1997 | Cho et al. |

(Continued)

FOREIGN PATENT DOCUMENTS

CA 2574171 1/2006
JP 02049088 A * 2/1990

OTHER PUBLICATIONS

English Abstract of JP-02049088 A; Feb. 1990; Tagoshi et al.*
E. Arancibia et al., Mechanism of Vinyl Monomer Polymerization in the Presence of Trialkylboranes and Inhibitors, Journal of Polymer Science: Part A-1, vol. 7 (1969), 3430-3433, Jun. 13, 1969, Universidad Ténica del Estado, Santiago, Chile.
F. S. Arimoto, Polymerization with Organoboron Compounds, Journal of Polymer Science: Part A-1, vol. 4, 275-282 (1966), E.I. duPont de Nemours and Company, Inc. Wilmington, Delaware.

(Continued)

Primary Examiner — Karuna P Reddy

(57) ABSTRACT

The invention is a two part polymerizable composition comprising in one part an organoboron compound capable of forming free radical generating species amine complex and in the second part one or more compounds capable of free radical polymerization and a cure accelerator comprising a) at least one compound containing a quinone structure or b) at least one compound containing at least one aromatic ring and one or more, preferably two substituents on the aromatic ring selected from hydroxyl, ether and both, where there are two substituents they are located either ortho or para with respect to one another and a peroxide containing compound. The second part may further contain an agent capable of causing the organoboron compound to form free radical generating species upon contacting the two parts. The first part may further comprises one or more compounds capable of free radical polymerization. This facilitates formulating compositions that have commercially desirable volumetric ratios of the two parts. Adhesive compositions of the present formulation provide excellent adhesion to low surface energy substrates, such as plastics.

11 Claims, No Drawings

U.S. PATENT DOCUMENTS

| | | |
|---|---|---|
| 5,681,910 A | 10/1997 | Pocius |
| 5,684,102 A | 11/1997 | Pocius |
| 5,686,544 A | 11/1997 | Pocius |
| 5,690,780 A | 11/1997 | Zharov et al. |
| 5,691,065 A | 11/1997 | Zharov et al. |
| 5,705,561 A | 1/1998 | Kozakiewicz et al. |
| 5,718,977 A | 2/1998 | Pocius |
| 5,721,281 A | 2/1998 | Blount |
| 5,795,657 A | 8/1998 | Pocius et al. |
| 5,807,910 A | 9/1998 | Tseng et al. |
| 5,817,376 A | 10/1998 | Everaerts et al. |
| 5,837,155 A | 11/1998 | Inagaki et al. |
| 5,859,155 A | 1/1999 | Furihata et al. |
| 5,872,197 A | 2/1999 | Deviny |
| 5,883,208 A | 3/1999 | Deviny |
| 5,912,433 A | 6/1999 | Pulido |
| 5,935,711 A | 8/1999 | Pocius et al. |
| 5,948,854 A | 9/1999 | De Buyl et al. |
| 5,952,409 A | 9/1999 | Boardman et al. |
| 5,990,036 A | 11/1999 | Deviny |
| 5,994,484 A | 11/1999 | Pocius |
| 6,001,928 A | 12/1999 | Harkness et al. |
| 6,008,284 A | 12/1999 | Nylund et al. |
| 6,008,308 A | 12/1999 | Pocius |
| 6,027,813 A | 2/2000 | Deviny |
| 6,054,548 A | 4/2000 | Currie et al. |
| 6,090,904 A | 7/2000 | Körner et al. |
| 6,093,778 A | 7/2000 | Pocius |
| 6,207,781 B1 | 3/2001 | Halloran et al. |
| 6,252,023 B1 | 6/2001 | Moren |
| 6,339,114 B1 | 1/2002 | Klee et al. |
| 6,410,667 B1 | 6/2002 | Moren |
| 6,482,868 B1* | 11/2002 | Mahoney et al. ............... 522/17 |
| 6,630,555 B2 | 10/2003 | Kendal et al. |
| 6,706,831 B2 | 3/2004 | Sonnenschein et al. |
| 6,710,145 B2 | 3/2004 | Sonnenschein et al. |
| 6,713,578 B2 | 3/2004 | Sonnenschein et al. |
| 6,713,579 B2 | 3/2004 | Sonnenschein et al. |
| 6,730,759 B2 | 5/2004 | Sonnenschein et al. |
| 6,740,716 B2 | 5/2004 | Sonnenschein et al. |
| 6,762,260 B2 | 7/2004 | Sonnenschein et al. |
| 6,777,512 B1 | 8/2004 | Sonnenschein et al. |
| 6,806,330 B1 | 10/2004 | Sonnenschein et al. |
| 6,844,080 B2 | 1/2005 | Kneafsey et al. |
| 7,189,303 B2 | 3/2007 | Deviny et al. |
| 7,267,886 B2 | 9/2007 | Kneafsey et al. |
| 2002/0028894 A1* | 3/2002 | Sonnenschein et al. ...... 526/198 |
| 2002/0111439 A1 | 8/2002 | Attarwala et al. |
| 2003/0018611 A1 | 1/2003 | Yano et al. |
| 2003/0226472 A1 | 12/2003 | Kneafsey et al. |
| 2004/0068067 A1 | 4/2004 | Kneafsey et al. |
| 2004/0082743 A1 | 4/2004 | Sonnenschein et al. |

OTHER PUBLICATIONS

Bailey, Electron Microscope Studies on Polyethylene and Polypropylene Journal of Polymer Science, vol. 62, (1962), pp. 241-249, Sep. 11, 1961, Baton, Rouge, LA.

V. A. Dorokhov et al., Organoboron Compounds CCCIX. Complexes of Trialkylboranes with Amidines, ZH. Obshch. Khim., vol. 46, No. 55, pp. 1057-1064, May 1976, Plenum Publishing Corporation, New York, NY.

V. A. Dodonov et al., Polymerization of some Vinyl Monomers on Triisobutylboron-Containing Radical Initiators in the Presence of Hydroquinone and Benzoquinone, Polymer Science, vol. 35, No. 3, 1993, 403-406, Nizhnii Novgorod, 603600, Russia.

Seiichiro Fujisawa et al., Dental Self-Curing Resins. XI. Characterization of Several Complexes of tri-n-butyl Borane as an Initiator, 73:88532, XP002160417—Abstract & Iyo Kizai Kenkyusho Hokoku, Tokyo Ika Shika Daigaku (1969), 3, 64-71, Chemical Abstract.

J. Grotewold et al., Vinyl Monomer Polymerization Mechanism in the Presence of Trialkylboranes, Journal of Polymer Science: Part A-1, vol. 6, 3157-3162 (1968), Técnica del Estado, Santiago, Chile.

J. Harris et al., Proposed Mechanism for the Curing of Epoxy Resins with Amine-Lewis Acid Complexes or Salts, J. Appl. Polym. Sci., 10, 523-534 (1966), Koppers Co., Inc., Monroeville, PA.

Hoberg et al., Journal of Organometallic Chemistry, 1976, 118, C3-C5 (no translation provided), Elsevier Sequoia, S.A., Lausanne, Netherlands.

Herbert O. House, Modern Synthetic Reactions, pp. 786 (1972), Georgia Institute of Technology, The Benjamin/Cummings Publishing Company.

Susumu Iwabuchi et al., The Copolymerization of Vinylhydroquinone and Acrylonitrile by Tri-n-butylborane, Polymer Journal, vol. 6, No. 2, 185-190 (1974), Chiba 280, Japan.

Dr. Gordon M. Kline, Plastics Technical Section, Acceleration of Glycidyl Epoxy Resin-Anhydride Reactions, pp. 149, 150, 152, 154, 155, 158, 160, 186, Apr. 1964, Sperry Gyroscope Co.

Roland Koester et al., Boron Compounds. XXVII. Borylation of Several Amino Carboxylic Acids, Justus Liebigs Ann, Chem. (1974), 112-119, XP000982170, (no translation provided).

V. Kokle et al., Journal of Polymer Science, The Molecular Structure of Polyethylene. XI. Weight-and Number-Average Molecular Weights of Selected Samples, vol. 62, 251-261 (1962), E.I. duPont de Nemours and Co., Wilmington, Delaware.

Kuniharu Kojima et al., Polymer Letters, vol. 8, pp. 541-547 (1970) Polymerization of Methyl Methacrylate by Trialkylborane-Pyridine System, Chiba University, Yayoi-Cho, China.

Peter Love et al., Polar Substituent Effects in Gas-Phase Lewis Acid-Base Equilibria. I. Intrinsic Basicity of Amines, J. Amer. Chem. Soc. (May 8, 1968), 90(10), 2455-62, XP000982168, tables 1,EX. T, col. 4 and 5.

M. Tsukada et al., Grafting of Methyl Methacrylate Onto Silk Fibers Initiated by Tri-n-Butylborane, Journal of Applied Polymer Science, vol. 42, (1991), pp. 2115-2121, John Wiley & Sons, Inc.

Chemical Abstract 116:195541w, Epoxy Resin Binder for Commutator Sheet Mica, Ivanilova et al.

Chemical Abstract, vol. 119, 1983, p. 78, 119:74163c, Acrylic Adhesive Composition, and Organoboron Initiator System, Martin Skoultchi et al., Ablestick Labs.

Chemical Abstract, 128:218101s, Acrylic Adhesive Compositions, JP 10-046,125, No. 18, 1998, p. 218099, Yishihiro Kimura.

Derwent Abstract 84-159009/26, DD207436-A, Veb Filmfab Wolfen.

Derwent Abstract 87-331368/47, J62236-878-A, Sumitomo Elec Ind KK.

Derwent Abstract 88-202092/29, J63139-969-A, Kanegafuchi Chem KK.

Derwent Abstract 90-332394/44, J02240130-A, Denki Kagaku Kogyo KK.

Derwent Abstract 92-085634/11, J04029-391-A, Shinetsu Chem Ind KK.

Derwent Abstract 92-289585/35, JP04199694-A, Shinetsu Chem Ind Co. Ltd.

Derwent Abstract 94-164114/20, JP06107907-A, Nippon Zeon KK.

Derwent Abstract 95-041525/06, JP06322324-A, Shinetsu Chem Ind Co. Ltd.

Derwent Abstract 95-049086/07, JP06330015-A, Nissan Motor Co. Ltd.

Derwent Abstract 96-453820/45, ADGE=93.05.28, Adgeziv Co. Ltd., RU 2054022-C1.

Derwent Abstract 96-484098, SU 1457392A1, Dodonov et al.

Derwent Abstract 97-010377, SU 1609117A1, Dodonov et al.

Derwent Abstract 97-064052, SU162491A1, Dodonov et al.

Derwent Abstract 97-529863/49, JP09208921-A, Shinetsu Chem Ind Co. Ltd.

Derwent Abstract 98-189554/17, JP10046126-A, Nippon Synthetic Chem Ind Co.

Derwent Abstract 98-343543/30, JP10130612-A, Nippon Synthetic Chem Ind Co.

Derwent Abstract 98-357757/31, JP 10140119-A, Nippon Synthetic Chem Inc Co.

Derwent Abstract 99-010842/02, DE 19738208-A1, T. Tseng et al.

Derwent Abstract 99-283642/24, JP11092593-A, Hitachi Chem Co. Ltd.

* cited by examiner

ACCELERATED ORGANOBORANE AMINE COMPLEX INITIATED POLYMERIZABLE COMPOSITIONS

CROSS REFERENCE TO RELATED APPLICATIONS

This application is a divisional of prior application Ser. No. 11/019,056, filed Dec. 21, 2004 now U.S. Pat. No. 7,534,843. This application claims the benefit of U.S. Provisional Application No. 60/532,066, filed Dec. 22, 2003.

BACKGROUND OF THE INVENTION

This invention relates to accelerated polymerizable compositions comprising compounds containing moieties capable of free radical polymerization, organoboron compounds capable of forming free radical generating species capable of initiating free radical polymerization and adhesives based on such compositions. In another embodiment the invention relates to a method of polymerizing compounds containing moieties capable of free radical polymerization and to methods of bonding substrates using such compositions.

Low surface energy olefins such as polyethylene, polypropylene and polytetrafluoroethylene have a variety of attractive properties in a variety of uses, such as toys, automobile parts, furniture applications and the like. Because of the low surface energy of these plastic materials, it is very difficult to find adhesive compositions that bond to these materials. The commercially available adhesives that are used for these plastics require time consuming or extensive pretreatment of the surface before the adhesive will bond to the surface. Such pretreatments include corona treatment, flame treatment, the application of primers, and the like. The requirement for extensive pretreatment of the surface results in significant limitations to the designers of automobile components, toys, furniture and the like.

A series of patents issued to Skoultchi, U.S. Pat. Nos. 5,106,928; 5,143,884; 5,286,821; 5,310,835 and 5,376,746 (all incorporated herein by reference) and to Zharov, et al., U.S. Pat. Nos. 5,539,070; 5,690,780; and 5,691,065 (all incorporated herein by reference) disclose polymerizable acrylic compositions which are particularly useful as adhesives wherein organoboron amine complexes are used to initiate cure. It is disclosed that these complexes are good for initiating polymerization of an adhesive that bonds to low surface energy substrates. Pocius in a series of patents, U.S. Pat. No. 5,616,796; U.S. Pat. No. 5,621,143; U.S. Pat. No. 5,681,910; U.S. Pat. No. 5,686,544; U.S. Pat. No. 5,718,977; and U.S. Pat. No. 5,795,657 (all incorporated herein by reference) disclose amine organoboron complexes with a variety of amines used to complex the organoboron such as polyoxyalkylene polyamines and polyamines which are the reaction product of diprimary amines and compound having at least two groups which react with a primary amine.

A series of patents by Sonnenschein et al. U.S. Pat. Nos. 6,806,330; 6,730,759; 6,706,831; 6,713,578; 6,713,579 and 6,710,145, disclose amine organoboron complexes wherein the organoboron is a trialkyl borane and the amine is selected from the group of amines having an amidine structural component; aliphatic heterocycles having at least one nitrogen in the heterocyclic ring; an alicyclic compound having bound to the ring a substituent having an amine moiety; primary amines which in addition have one or more hydrogen bond accepting groups wherein there are at least two carbon atoms, preferably at least three carbon atoms, between the primary amine and the hydrogen bond accepting group; and conjugated imines. These patent applications disclose polymerizable compositions containing the amine organoboron complexes one or more of monomers, oligomers or polymers having olefinic unsaturation which are capable of polymerization by free radical polymerization and that the polymerizable compositions can be used as adhesive, sealant, coating or ink compositions.

Some of the references discussed above disclose the use of phenolic compounds, such as hydroquinones to stabilize the compositions against undesired polymerization. See Pocius, U.S. Pat. No. 5,684,102 at column 18, lines 45-53; Pocius, U.S. Pat. No. 5,861,910 at column 13 lines 17 to 24. Jennes, U.S. Pat. No. 3,236,823 discloses the use of hydroquinones, phenathiazine or t-butyl pyrocatechol as stabilizers in alkylborane initiated acrylate systems. Many of the disclosed compositions polymerize more slowly than is desired for use in industrial processes. This results in processes which exhibit low productivity.

Therefore, there is a need for adhesive systems that are capable of bonding to low surface energy substrates, and initiator systems which facilitate such bonding. What are further needed are polymer compositions and adhesive systems which are thermally stable at, or near, ambient temperatures and which will undergo polymerization when the user desires. Also needed are adhesive compositions which are capable of bonding to low surface energy substrates, and bonding low surface energy substrates to other substrates, without the need for extensive or costly pretreatment. Further compositions that can be used in existing commercial equipment at mix ratios of 4:1 or less are needed. Compositions that have stability, strength and adhesion at elevated temperatures are also desired. Further needed are compositions which cure rapidly as many industrial processes require fast cycle times.

SUMMARY OF INVENTION

The invention is a two part polymerizable composition comprising in one part an organoboron compound capable of forming free radical generating species amine complex and in the second part one or more compounds capable of free radical polymerization and a cure accelerator comprising a) at least one compound containing a quinone structure or b) at least one compound containing at least one aromatic ring and one or more, preferably two substituents, on the aromatic ring selected from hydroxyl, ether and both. Where there are two substituents they are located either ortho or para with respect to one another and a peroxide containing compound. The second part may further contain an agent capable of causing the organoboron compound to form free radical generating species upon contacting the two parts. The first part may further comprise one or more compounds capable of free radical polymerization. This facilitates formulating compositions that have commercially desirable volumetric ratios of the two parts. Adhesive compositions of the present formulation provide excellent adhesion to low surface energy substrates, such as plastics.

The invention is also a method of polymerization comprising contacting the components of the polymerizable composition under conditions such that the polymerizable compounds undergo polymerization. In one embodiment, the contacting occurs at, or near, ambient temperature. In another embodiment, the method further comprises the step of heating the polymerized composition to an elevated temperature under conditions such that the organoboron compound forms a free radical generating species.

In yet another embodiment the invention is a method of bonding two or more substrates together which comprises contacting the components of the polymerizable composition together under conditions, such that polymerization is initiated; contacting the polymerizable composition with the two or more substrates; positioning the two or more substrates, such that the polymerizable composition is located between the two or more substrates; and allowing the polymerizable composition to polymerize and to bond the two or more substrates together. In yet another embodiment the invention is a method of coating a substrate which comprises contacting a composition according to the invention with one or more surfaces of a substrate and initiating polymerization of the composition according to the invention. In another embodiment the invention is a laminate comprising two substrates having disposed between the substrates and bound to each substrate a composition according to the invention.

The polymerizable compositions of the invention are stable at, or near, ambient temperature and can be cured upon demand by contacting the two parts of the composition, or alternatively by contacting the two parts of the composition and thereafter heating the compositions above the temperature at which the organoboron compound forms a free radical generating species. Furthermore, the polymerizable compositions of the invention can form good bonds to low surface energy substrates without the need for primers or surface treatment. The polymerizable compositions of the invention may be formulated to be dispensed in commercial equipment at volume ratios of the two parts of 4:1 or less. The polymerized compositions demonstrate excellent cohesive and adhesive strength at elevated temperatures and thus demonstrate excellent stability at high temperatures. The polymerizable compositions of the invention exhibit rapid cure and preferably exhibit a lap shear strength according to ASTM 03165-91 of 50 psi or greater 1 hour after application. Preferably, the polymerizable compositions demonstrate excellent adhesion to substrates along with the rapid cure as discussed.

DETAILED DESCRIPTION OF THE INVENTION

The polymerization initiator is an organoboron containing compound which is capable of forming a trivalent organoboron compound. In a preferred embodiment, the free radical generating species is a trivalent organoboron compound free radical generating species. Preferred boron containing compounds are tetravalent in that they have four bonds to the boron of which at least three are covalent and one may be covalent or in the form of an electronic association with a complexing agent. The free radical generating species, such as a trivalent boron compound, is formed when the boron containing compound is contacted with another substance, referred to herein as a decomplexing agent or initiator. The free radical generating species generates free radicals by reacting with environmental oxygen. In the embodiment wherein the boron containing compound is tetravalent such contacting causes the abstraction of one of the ligands bonded to or complexed to the boron atom to convert it to a trivalent borane. Free radical generating species is a compound that contains or generates free radicals under polymerization conditions. The decomplexing agent or initiator can be any compound which reacts with the complexing agent or which abstracts a cation from the boron containing compound. Preferably, the boron containing compound is an organoborate or an organoboron amine complex.

An organoborate is a salt of a positive cation and an anionic tetravalent boron. Any organoborate which can be converted to an organoboron by contact with a decomplexing agent or initiator may be used. One class of preferred organoborates, (also known as quaternary boron salts) are disclosed in Kneafsey et al., U.S. 2003/0226472 and Kneafsey et al., U.S. 2004/0068067, both incorporated herein by reference. Preferred organoborates disclosed in these two U.S. patent applications are described by the following formula

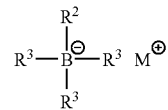

wherein
$R^2$ is $C_1$-$C_{10}$ alkyl;
$R^3$ is independently in each occurrence $C_1$-$C_{10}$ alkyl, $C_3$-$C_{10}$ cycloalkyl, phenyl, phenyl-substituted $C_1$-$C_{10}$ alkyl or phenyl substituted $C_3$-$C_{10}$ cycloalkyl, provided that any two of $R^2$ and/or $R^3$ may optionally be part of a carbocyclic ring; and $M^+$ is a metal ion or a quaternary ammonium ion. Preferred examples of organoborates include sodium tetraethyl borate, lithium tetraethyl borate, lithium phenyl triethyl borate and tetramethylammonium phenyl triethyl borate.

In another embodiment, the organoborate is an internally blocked borate as disclosed in Kendall et al., U.S. Pat. No. 6,630,555, incorporated herein by reference. Disclosed in this patent are four coordinate internally blocked borates wherein the boron atom is part of a ring structure further containing an oxa or thio-moiety. The internally blocked heterocyclic borates preferably have the following structure:

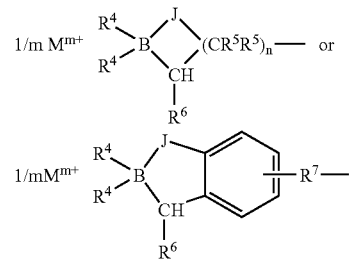

wherein J is oxygen or sulfur; when J represents oxygen, n is the integer 2, 3, 4 or 5; when J represents sulfur, n is the integer 1, 2, 3, 4 or 5; $R^4$, $R^5$, $R^6$ and $R^7$ are independently, substituted or unsubstituted alkyl or alkylene groups containing 1 to 10 carbon atoms, substituted aryl groups having up to 7 to 12 carbon atoms or unsubstituted aryl groups; $R^5$, $R^6$ and $R^7$ can be hydrogen; $R^4$ can be part of a second unsubstituted or substituted cyclic borate; $R^4$ can comprise a spiro ring or a spiro-ether ring; $R^4$ together with $R^5$ can be linked to form a cycloaliphatic ring; or $R^4$ together with $R^5$ can comprise a cyclic ether ring and M is any positively charged species; with m being a number greater than 0.

The term "internally blocked" in reference to the organoborates described herein means a four coordinate boron atom being part of an internal ring structure bridged across two of the four boron coordinates or valences. Internal blocking includes a single ring or a multi-ring structure where boron is part of one or multi-ring structures.

In the embodiment where the organoboron compound is in the form of an amine complex, the free radical generating species used in the invention is a trialkyl borane or an alkyl cycloalkyl borane. The organoboron used in the complex is a trialkyl borane or an alkyl cycloalkyl borane. Preferably such borane corresponds to the Formula:

wherein B represents Boron; and $R^1$ is separately in each occurrence a $C_{1-10}$ alkyl, $C_{3-10}$ cycloalkyl, or two or more of $R^1$ may combine to form a cycloaliphatic ring. Preferably $R^1$ is $C_{1-4}$ alkyl, even more preferably $C_{2-4}$ alkyl, and most preferably $C_{3-4}$ alkyl. Among preferred organoborons are tri-ethyl borane, tri-isopropyl borane and tri-n-butylborane.

In the embodiment wherein the organoboron compound is an organoboron amine complex, the organoboron is a trivalent organoboron and the amine can be any amine which complexes reversibly with the organoboron. Such complexes are represented by the formula

wherein $R^1$ is described hereinbefore and Am is an amine.

The amines used to complex the organoboron compound can be any amine or mixture of amines which complex the organoboron and which can be decomplexed when exposed to a decomplexing agent. The desirability of the use of a given amine in an amine/organoboron complex can be calculated from the energy difference between the Lewis acid-base complex and the sum of energies of the isolated Lewis acid (organoboron) and base (amine) known as binding energy. The more negative the binding energy the more stable the complex.

Binding Energy=−(Complex Energy−(Energy of Lewis Acid+Energy of Lewis base))

Such binding energies can be calculated using theoretical ab-initio methods such as the Hartree Fock method and the 3-21G basis set. These computational methods are available commercially employing commercial software and hardware such as SPARTAN and Gaussian 98 programs with a Silicon Graphics workstation. Amines having amine/organoboron binding energies of 10 kilocalories per mol or greater are preferred, amines having a binding energy of 15 kilocalories per mol or greater are more preferred and even more preferred are amines with a binding 20 kilocalories per mol or greater are most preferred. In the embodiment where polymerization of the compositions of the invention is initiated by use of a decomplexing agent the binding energy of the amine to the organoboron is preferably about 50 kcal/mole or less and most preferably about 30 kcal/mole or less. In the embodiment where polymerization of the compositions of the invention is initiated by use of heat, the binding energy of the amine is preferably about 100 kcal/mole or less, more preferably about 80 kcal/mole or less and most preferably about 50 kcal/mole or less.

Preferred amines include the primary or secondary amines or polyamines containing primary or secondary amine groups, or ammonia as disclosed in Zharov, U.S. Pat. No. 5,539,070 at column 5, lines 41 to 53, incorporated herein by reference, Skoultchi, U.S. Pat. No. 5,106,928 at column 2, line 29 to 58, incorporated herein by reference, and Pocius, U.S. Pat. No. 5,686,544 at column 7, line 29 to column 10 line 36, incorporated herein by reference; ethanolamine, secondary dialkyl diamines or polyoxyalkylenepolyamines; and amine terminated reaction products of diamines and compounds having two or more groups reactive with amines as disclosed in Deviny, U.S. Pat. No. 5,883,208 at column 7, line 30 to column 8 line 56, incorporated herein by reference. With respect to the reaction products described in Deviny the preferred diprimary amines include alkyl diprimary amines, aryl diprimary amines, alkyaryl diprimary amines and polyoxyalkylene diamines; and compounds reactive with amines include compounds which contain two or more moieties of carboxylic acids, carboxylic acid esters, carboxylic acid halides, aldehydes, epoxides, alcohols and acrylate groups. Preferred amines described in Deviny include n-octylamine, 1,6-diaminohexane (1,6-hexane diamine), diethylamine, dibutyl amine, diethylene triamine, dipropylene diamine, 1,3-propylene diamine (1,3-propane diamine), 1,2-propylene diamine, 1,2-ethane diamine, 1,5-pentane diamine, 1,12-dodecanediamine, 2-methyl-1,5-pentane diamine, 3-methyl-1,5-pentane diamine, triethylene tetraamine, diethylene triamine. Preferred polyoxyalkylene polyamines include polyethyleneoxide diamines, polypropyleneoxide diamines, triethylene glycol propylene diamine, polytetramethyleneoxide diamine and polyethyleneoxidecopolypropyleneoxide diamines.

In one preferred embodiment, the amine comprises a compound having a primary amine and one or more hydrogen bond accepting groups, wherein there are at least two carbon atoms, preferably at least about three, between the primary amine and hydrogen bond accepting groups. Preferably, an alkylene moiety is located between the primary amine and the hydrogen bond accepting group. Hydrogen bond accepting group means herein a functional group that through either inter- or intramolecular interaction with a hydrogen of the borane-complexing amine increases the electron density of the nitrogen of the amine group complexing with the borane. Preferred hydrogen bond accepting groups include primary amines, secondary amines, tertiary amines, ethers, halogen, polyethers, thioethers and polyamines. Preferred compounds having a primary amine and one or more hydrogen bond accepting groups are described in Sonnenschein et al., U.S. Pat. Nos. 6,730,759, (column 4, line 60 to column 5, line 67); 6,706,831; 6,713,578; 6,713,579 and 6,710,145 relevant portions, incorporated herein by reference. Preferably the compound having a primary amine and one or more hydrogen accepting groups is selected from the group of consisting of methoxypropylamine, methoxybutylamine, methoxyethylamine, ethoxypropylamine, propoxypropylamine, and amine terminated polyalkylene ethers.

In another embodiment the amine is an aliphatic heterocycle having at least one nitrogen in the heterocycle. The heterocyclic compound may also contain one or more of nitrogen, oxygen, sulfur or double bonds. In addition, the heterocycle may comprise multiple rings wherein at least one of the rings has nitrogen in the ring. Preferable aliphatic heterocyclic amines are described in Sonnenschein et al., U.S. Pat. Nos. 6,730,759 (column 6, lines 1 to 45); 6,706,831; 6,713,578; 6,713,579 and 6,710,145 relevant portions, incorporated herein by reference.

In yet another embodiment, the amine which is complexed with the organoboron is an amidine. Any compound with amidine structure wherein the amidine has sufficient binding energy as described hereinbefore with the organoboron, may be used. Preferred amidine compounds are described in Sonnenschein et al., U.S. Pat. Nos. 6,730,759, (column 6, line 4 to column 7, line 21); 6,706,831; 6,713,578; 6,713,579 and 6,710,145 relevant portions, incorporated herein by reference.

In yet another embodiment, the amine that is complexed with the organoboron is a conjugated imine. Any compound with a conjugated imine structure, wherein the imine has sufficient binding energy as described hereinbefore with the organoboron, may be used. The conjugated imine can be a straight or branched chain imine or a cyclic imine. Preferred imine compounds are described in Sonnenschein et al., U.S. Pat. Nos. 6,730,759 (column 7, line 22 to column 8, line 24);

6,706,831; 6,713,578; 6,713,579 and 6,710,145 relevant portions, incorporated herein by reference.

In another embodiment the amine can be an alicyclic compound having bound to the alicyclic ring a substituent containing an amine moiety. The amine containing alicyclic compound may have a second substituent that contains one or more nitrogen, oxygen, sulfur atoms or a double bond. The alicyclic ring can contain one or two double bonds. The alicyclic compound may be a single or multiple ring structure. Preferably the amine on the first substituent is primary or secondary. Preferably the alicyclic ring is a 5 or 6 membered ring. Preferably functional groups on the second substituent are amines, ethers, thioethers or halogens. Preferred alicyclic compound with one or more amines containing substituents Sonnenschein et al., U.S. Pat. Nos. 6,730,759 (column 8, line 25 to line 59); 6,706,831; 6,713,578; 6,713,579 and 6,710,145 relevant portions, incorporated herein by reference.

In another preferred embodiment the amine further contains siloxane, that is an amino siloxane. Any compound with both amine and siloxane units wherein the amine has sufficient binding energy as described hereinbefore with the organoboron, may be used. Preferred amines with siloxane moieties are further described in U.S. Pat. No. 6,777,512, and titled AMINE ORGANOBORANE COMPLEX INITIATED POLYMERIZABLE COMPOSITIONS CONTAINING SILOXANE POLYMERIZABLE COMPONENTS, (column 10, line 14 to column 11, line 29, incorporated herein by reference.

In the embodiment where the organoboron compound is an organoboron amine complex, the equivalent ratio of amine compound(s) to borane compound in the complex is relatively important. An excess of amine is preferred to enhance the stability of the complex and in the embodiment where the decomplexing agent is an isocyanate functional compound to react with the isocyanate functional compound thereby resulting in the presence of polyurea in the final product. The presence of polyurea improves the high temperature properties of the composition.

Compounds capable of free radical polymerization which may be used in the polymerizable compositions of the invention include any monomers, oligomers, polymers or mixtures thereof which contain olefinic unsaturation which can polymerize by free radical polymerization. Such compounds are well known to those skilled in the art. Mottus, U.S. Pat. No. 3,275,611, provides a description of such compounds at column 2, line 46 to column 4, line 16, incorporated herein by reference. Preferred classes of compounds containing olefinic unsaturation are Sonnenschein et al., U.S. Pat. Nos. 6,730,759 (column 9, line 7 to line 54); 6,706,831; 6,713,578; 6,713,579 and 6,710,145 relevant portions, incorporated herein by reference.

Examples of preferable acrylates and methacrylates are disclosed in Skoultchi, U.S. Pat. No. 5,286,821 at column 3, lines 50 to column 6, line 12, incorporated herein by reference and Pocius, U.S. Pat. No. 5,681,910 at column 9, line 28 to column 12, line 25, incorporated herein by reference. Also useful in these compositions are acrylate crosslinking molecules including ethylene glycol dimethacrylate, ethylene glycol diacrylate, triethyleneglycol dimethacrylate, diethylene glycol bismethacryloxy carbonate, polyethylene glycol diacrylate, tetraethylene glycol dimethacrylate, diglycerol diacrylate, diethylene glycol dimethacrylate, pentaerythritol triacrylate, trimethylolpropane trimethacrylate, isobornylmethacrylate and tetrahydrofurfuryl methacrylate.

In the embodiment where the composition is used as an adhesive, acrylate and/or methacrylate based compounds are preferably used as the compounds capable of free radical polymerization. The most preferred acrylate and methacrylate compounds include methylmethacrylate, butylmethacrylate, 2-ethylhexylmethacrylate, and cyclohexylmethylmethacrylate. Preferred amounts of compounds capable of free radical polymerization are preferably about 10 percent by weight or greater based on the total formulation weight, more preferably about 20 percent by weight or greater and most preferably about 30 percent by weight or greater. Preferred amounts of compounds capable of free radical polymerization are preferably about 90 percent by weight or less based on the total formulation weight, more preferably about 85 percent by weight or less and most preferred 80 percent by weight or less.

The compositions of the invention include two part polymerizable compositions comprising in one part an organoboron compound and one or more compounds containing one or more ring opening heterocyclic moieties, and in a second part, compounds capable of being polymerized by free radical polymerization, a catalyst capable of polymerizing compounds containing ring opening heterocyclic moieties a cure accelerator of the invention and optionally a component that will cause the organoboron compound to form a free radical generating species. In one embodiment the invention is a two phase system comprising a first phase containing one or more polymers prepared from the compounds which polymerize by free radical polymerization and a second phase comprising polymerized or partially polymerized compounds derived from one or more compounds containing ring opening heterocyclic moieties. In one embodiment the polymer prepared from the compounds containing heterocyclic ring opening moieties is not miscible with the polymer prepared by free radical polymerization and thus the resulting polymerized composition has at least two regions each rich in one of the two polymers formed. In one embodiment the two part compositions invention includes a polymerized portion comprising polymerized compound capable of free radical polymerization and a second portion comprising unpolymerized or partially polymerized compounds having ring opening heterocyclic moieties. The two portions can be miscible, partially miscible or immiscible. In a preferred embodiment the polymerized composition comprises two phases, one based on the compounds which polymerize through olefinic bonds and a second which polymerizes by a ring opening reaction of a heterocyclic moiety. The cured compositions of the invention preferably contain two regions that in many cases are not miscible. In some embodiments the two regions are separate phases or are interpenetrating networks of two different polymers. The two regions can be chemically bonded to one another if the composition includes a crosslinking compound.

The compound containing a heterocyclic ring opening moiety can be any monomer, oligomer or prepolymer containing a heterocyclic moiety capable of ring opening and polymerization. The heteroatom in the heterocyclic moiety is preferably nitrogen, oxygen or sulfur, with nitrogen and oxygen being preferred and oxygen being most preferred. Preferably the heterocyclic moiety is a 3 membered ring. Preferred heterocyclic moieties are oxirane and aziridine moieties, with oxirane moieties being most preferred. Preferred heterocyclic ring opening compounds are further described in Sonnenschein et al., U.S. Pat. No. 6,762,260 (column 10, line 34 to column 11, line 22), incorporated herein by reference.

The presence of the polymer derived from the heterocyclic ring opening polymerizable compound, such as oxirane and aziridine, improves adhesion to higher surface energy plastics such as nylon, and also the thermal properties of the polymerized or partially polymerized compositions of the invention.

A sufficient amount of the heterocyclic ring opening compound is used to improve the bonding to higher surface energy substrates and to improve the high temperature properties of the polymerized or partially polymerized composition. Thermal properties refer herein to higher glass transition temperatures of the polymerized compositions and improved cohesive strength at elevated temperatures, as evidenced by higher lap shear strengths at elevated temperature, such as 125 and 150° C. A significant improvement of glass transition temperature is 5° C. A significant improvement in lap shear strength is about 50 psi or greater at 125° C. The total polymerizable formulation may contain about 2 percent by weight of heterocyclic polymerizable compound or greater; more preferably about 5 percent by weight or greater and most preferred about 10 percent by weight or greater. The polymerizable formulation may contain about 50 percent by weight or less, more preferably about 45 percent by weight of less and most preferably about 40 percent by weight or less of heterocyclic polymerizable compound.

In some cases it may be useful to crosslink the free radical polymerizable compound phase to the heterocyclic ring opening polymerizable compound derived phase as described in Sonnenschein et al, U.S. Pat. No. 6,762,260 (column 11, line 53 to column 1, line 11), incorporated herein by reference. The amount of crosslinker used is that amount which gives the desired properties, that is, sufficient lap shear strength at 125° C. or above, yet does not cause the room temperature adhesive strength to go below the desired value. Preferred amounts of crosslinker are about 0 percent by weight or greater based on the weight of the polymerizable formulation, more preferably about 1 percent by weight or greater; even more preferably about 3 percent by weight or greater and most preferably about 5 percent by weight or greater. Preferably the amount of crosslinker used is about 20 percent by weight of the total polymerizable formulation or less; even more preferably about 15 percent by weight or less and most preferably about 12 percent by weight or less.

It is preferable that the heterocyclic ring opening polymerizable compound polymerize at a similar rate as the polymerization rate of the compounds containing moieties capable of free radical polymerization. If the reaction of one polymerizable component is too slow, the composition may vitrify prior to obtaining acceptable conversion of monomer to polymer of both phases. The unreacted components can act as a plasticizer and degrade properties, such as adhesion, thermal performance and the like. The properties of the final polymerized composition may be enhanced by post heating the polymerized composition to drive the completion of the polymerization of the heterocyclic polymerizable compounds. This is performed by heating the polymerized composition to a temperature above the glass transition temperature of the incompletely polymerized polymer(s). In this embodiment it is preferred to post cure at the expected use temperature of the structure, more preferred at 5° C. above the expected use temperature of the composition and most preferred to provide a thermal post cure of 10° C. above the expected use temperature of the polymerized composition. Examples of post cure procedures are disclosed in Briggs (U.S. Pat. No. 4,426,243) and Ersun-Hallsby, et al. (U.S. Pat. No. 5,204,386), incorporated herein by reference. A preferred embodiment of the ring opening polymerization of heterocyclic compounds is described in Sonnenschein et al., U.S. Pat. No. 6,762,260 (column 12, line 24 to line 65), incorporated herein by reference.

The organoboron compounds useful for polymerization of the compounds having moieties capable of free radical polymerization may be converted to compounds capable of forming free radical generating species by the application of a decomplexation agent that will cause the formation of compounds capable of forming free radical generating species, such as a trivalent borane compound, such as by displacing the amine from the borane. The formation of compounds capable of forming the free radical generating species such as, trivalent borane.

The displacement of the amine from the alkylborane can occur with any chemical for which the exchange energy is favorable, such as mineral acids, organic acids, Lewis acids, isocyanates, acid chlorides, sulphonyl chlorides, aldehydes, and the like. Preferred decomplexation agents are acids and isocyanates. In those embodiments where the initiator for the ring opening polymerization is a Lewis acid, the decomplexing agent may be omitted as Lewis acids may also function as the decomplexing agent. If the Lewis acid is used as the decomplexing agent and heterocyclic ring opening polymerization initiator no additional amounts are needed over those amounts needed to initiate polymerization. The choice of initiator may be impacted by the use of the polymerizable composition. In particular, where the polymerizable composition is an adhesive and the material to which it will be bonded is polypropylene, the preferred class of initiators is isocyanate initiators and where the substrate is nylon the preferred initiators are acids. Polymerization may also be initiated thermally. The temperature at which the composition is heated to initiate polymerization is dictated by the binding energy of the complex. Generally the temperature used to initiate the polymerization by decomplexing the complex is about 30° C. or greater and preferably about 50° C. or greater. Preferably the temperature at which thermally initiated polymerization is initiated is about 120° C. or less and more preferably about 100° C. or less. Any heat source that heats the composition to the desired temperature can be used, provided the heat source does not negatively impact the components of the composition or its function. In this manner the composition may be contacted with the substrates either before or after the composition is exposed to heat. If the composition is heated prior to contact with the substrates, the composition should be contacted with the substrates before the composition has polymerized to the point at which the composition is no longer able to adhere to the substrates. It may be necessary in the thermally initiated reaction to control the oxygen content such that there is adequate oxygen to create favorable conditions for radical formation but not so much as to inhibit the polymerization.

In one embodiment the invention of the polymerizable compositions may further comprise one or more compounds, oligomers or prepolymers having a siloxane backbone and reactive moieties capable of polymerization a catalyst for the polymerization of the one or more compounds, oligomers or prepolymers having a siloxane backbone and reactive moieties capable of polymerization as disclosed in U.S. Pat. No. 6,777,512, titled AMINE ORGANOBORANE COMPLEX INITIATED POLYMERIZABLE COMPOSITIONS CONTAINING SILOXANE POLYMERIZABLE COMPONENTS (column 12, line 66 to column 15, line 54), incorporated herein by reference.

The compositions of the invention may further contain a stabilizing amount of a dihydrocarbyl hydroxylamine. Stabilizing as used herein refers to preventing polymerization until desired. Generally this means that polymerization is inhibited under normal storage conditions. Normal storage conditions mean storage at a temperature of about 0° C. to about 40° C., wherein the adhesive is stored in a sealed container. A stable composition is one that does not experience undesired viscosity growth during a defined period. Viscosity growth is evidence of polymerization of the monomers present. In a preferred embodiment, a composition is stable if the viscosity does not increase more than 150 percent over a time period of 30 days when stored at temperatures of 40° C. or less, more preferably 100 percent or less over a time period of 30 days and most preferably 50 percent or less over a time period of 30 days.

Dihydrocarbyl hydroxylamines useful herein include any such compounds which when included in the compositions of this invention; improve the stability of the compositions as described herein. Preferred dihydrocarbyl amines correspond to the formula $(R^{11})_2N$—OH
wherein $R^{11}$ is independently in each occurrence a hydrocarbyl moiety. Preferably $R^{13}$ is independently in each occurrence a $C_{2-30}$ alkyl, alkaryl or aryl moiety; more preferably a $C_{10-20}$ alkyl, alkaryl or aryl moiety; with $C_{10-20}$ alkyl moieties being even more preferred. Among preferred dihydrocarbyl hydroxylamines are hydroxylamine freebase from BASF, hydroxylamine derivatives from Mitsui Chemicals America, Inc. and Irgastab FS Products from Ciba Specialty Chemicals which contains oxidized bis(hydrogenate tallow alkyl) amine also described as bis(N-dodecyl) N-hydroxylamine. The dihydrocarbyl hydroxylamines are utilized in sufficient amounts to stabilize the compositions of the invention. Preferably the dihydrocarbyl hydroxylamines are used in an amount of about 1 parts per million of the compositions of the invention or greater, more preferably about 2 parts per million or greater and most preferably about 5 parts per million or greater. Preferably the dihydrocarbyl hydroxylamines are used in an amount of about 100,000 parts per million of the compositions of the invention or less, more preferably about 50,000 parts per million or less, even more preferably about 10,000 parts per million or less and most preferably about 3,000 parts per million or less.

The compositions of the invention further comprise an accelerator for the cure of the polymerizable compositions. The accelerators comprise at least one compound containing a quinone structure or at least one compound containing at least one aromatic ring and one or more preferably two substituents, on the aromatic ring selected from hydroxyl, ether and both when two substituents are used and they are located either ortho or para with respect to one another.

In one embodiment the accelerator is any compound containing a quinone structure which compound accelerates the cure of the polymerizable compositions. For adhesive compositions preferred quinones also facilitate adhesion of the polymerizable compositions to substrate surfaces. Preferred quinone compounds contain the following structure:

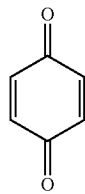

Preferred classes of quinone compounds are substituted or unsubstituted quinone, napthaquinone or anthraquinones. The substituent can be any substituent that does not interfere in the formation of free radicals or the reaction of the free radicals with other compounds. Preferred quinone containing compounds correspond to one of the formulas containing compound which corresponds to one of the structures:

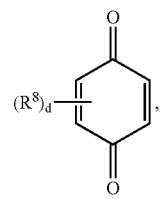

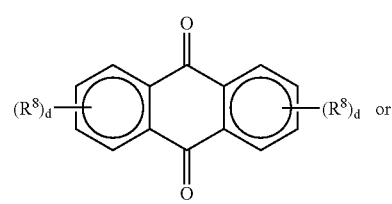

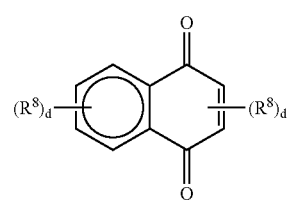

wherein $R^8$ is separately in each occurrence is any substituent which does not prevent free radical formation or free radical reaction with other compounds; and
d is separately in each occurrence an integer of from 0 to 4. Preferred quinone containing compounds are quinone compounds. Quinone compounds preferably correspond to the formula:

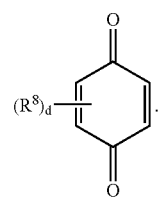

Preferably, $R^8$ is Separately in each occurrence $R^9$, $OR^9$ or $SR^9$, wherein $R^9$ is separately in each occurrence substituted or unsubstituted hydrocarbyl; more preferably substituted or unsubstituted alkyl, aryl, aralkyl, even more preferably substituted or unsubstituted $C_{1-80}$ alkyl $C_{6-60}$ aryl, $C_{6-90}$ aralkyl, and most preferably $C_{1-10}$ alkyl and $C_{6-14}$ aryl. Preferably d is 0 to 2, even more preferably 0 to 1, and most preferably 0. Among preferred quinone structure containing compounds are benzoquinone and ortho, meta, or para substituted benzoquinone and ortho and para quinone. Preferably $R^8$ is $R^9$ or $OR^9$. More preferred quinones include anthraquinone, benzoquinone, 2-phenylbenzoquinone, orthoquinone and substituted benzoquinone. Most preferred quinones containing compounds include benzoquinone.

The amount of quinone used is that amount which accelerates cure of the compositions and does not inhibit adhesion of the composition to the substrate surface. If too little is used there is no significant increase in cure speed. If too much is used and the composition will not adhere to a substrate surface. Preferably the quinone is used in an amount of about 0.01 percent by weight of the polymerizable composition or greater, more preferably about 0.02 percent by weight or greater, and most preferably about 0.04 percent by weight or greater. Preferably the quinone is used in an amount of about 0.1 percent by weight of the polymerizable composition or less, more preferably about 0.8 percent by weight or less, and most preferably about 0.4 percent by weight or less. In a preferred embodiment, the quinone accelerator is present in an amount of about 0.1 percent to about 4.0 percent by weight of the resin part of the composition.

In another embodiment the accelerator comprises at least one compound containing at least one aromatic ring and at least one, preferably two substituents on the aromatic ring selected from hydroxyl, ether and both wherein the two substituents are located either ortho or para with respect to one another, hereinafter substituted aromatic ring containing compound and a compound having a peroxy moiety. The substituted aromatic compound can contain any aromatic moiety, including those with multiple ring structures. The compounds preferably contain two or more functional groups selected from hydroxy and ether. Preferably the substituted aromatic compounds contain at least one hydroxy and another hydroxy or ether moiety. Most preferably the substituted aromatic compound contains at least one hydroxy and at least one ether moiety. Preferably the substituted compounds contain benzene, anthracene or napthalene aromatic ring structures. The substituted aromatic compounds may be substituted with any substituent which does not interfere with the formation of free radicals or the reaction of the free radicals with other compounds. Preferred substituents include alkyl, aryl, or aralkyl groups, and hetero atoms containing groups selected from the group comprising oxygen and sulfur. Most preferred substituents include aryl groups and hetero atom containing groups.

Preferably, the substituted aromatic compounds correspond to one of the formulas

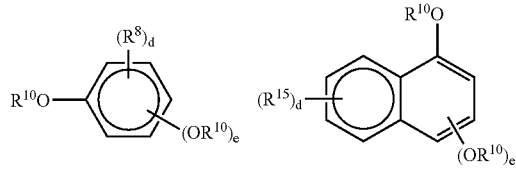

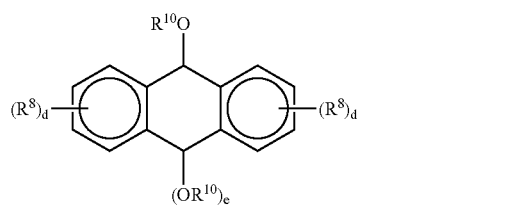

wherein $R^{10}$ is separately in each occurrence hydrogen or any substituent which does not prevent free radical formation or free radical reaction with other compounds; and $R^8$ and d are as previously defined. Preferably, $R^{10}$ is separately in each occurrence substituted or unsubstituted hydrocarbyl; more preferably substituted or unsubstituted alkyl, aryl, aralkyl or aralkyl; even more preferably substituted or unsubstituted $C_{1-100}$ alkyl $C_{6-90}$ aryl, or $C_{6-90}$ aralkyl and most preferably $C_{1-20}$ alkyl. e is 0 or 1, preferably 1.

More preferably the substituted aromatic containing compounds correspond to the formulas:

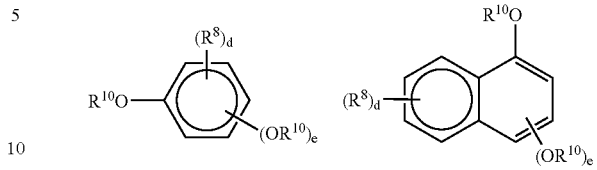

wherein $R^8$, $R^{10}$, d and e are described above.

Among most preferred substituted aromatic ring containing compounds are anthrahydroquinones, napthahydroquinones, methyl ether of hydroquinone and alkylethers of hydroquinone. The amount of substituted aromatic ring containing compound used is that amount which accelerates cure of the compositions, and which does not inhibit adhesion of the composition to the substrate surface is used. If too little is used there is no significant increase in cure speed. If too much is used and the composition will not adhere to a substrate surface. Preferably the substituted aromatic ring containing compound is used in an amount of about 0.1 percent by weight of the polymerizable composition or greater, more preferably about 1 percent by weight or greater, and most preferably about 2 percent by weight or greater. Preferably the substituted aromatic ring-containing compound is used in an amount of about 4 percent by weight of the polymerizable composition or less, more preferably about 3 percent by weight or less, and most preferably about 2.5 percent by weight or less.

In conjunction with the substituted aromatic ring-containing compound a peroxy-containing compound is used. Any peroxy-containing compound that reacts with the substituted aromatic ring-containing compound to form free radicals may be used. Preferred peroxy-containing include dialkyl peroxides, diaryl peroxides, diacyl peroxides, alkyl hydroperoxides, aryl hydroperoxides, and aryl hydroperoxides. More preferred peroxy-containing compounds include t-butyl peroxides, benzoyl peroxide, t-butyl perbenzoate. Most preferred peroxy-containing compounds include benzoyl peroxide and t-butyl perbenzoate.

The amount of peroxy-containing containing compound used is that amount which accelerates cure of the compositions. If too little is used there is no significant increase in cure speed. If too much is used the adhesive does not bond to polyolefins. Preferably the peroxy-containing compound is used in an amount of about 0.1 percent by weight of the polymerizable composition or greater, more preferably about 1 percent by weight or greater, and most preferably about 2 percent by weight or greater. Preferably the peroxy-containing compound is used in an amount of about 4 percent by weight or less of the polymerizable composition, more preferably about 3 percent by weight or less, and most preferably about 2.5 percent by weight or less.

Preferably, the relative amount of peroxy containing compound to substituted aromatic ring containing compound is selected such that the majority of the resultant free radicals generated by the peroxy compound reacts with the substituted aromatic ring compound. Thus, a molar ratio of peroxy containing compound to aromatic ring compound is one or less. If the ratio is too high then no adhesion to polyolefins would be observed. If the ratio is too low then the adhesive cure rate is not increased. Preferably the ratio amount of peroxy containing compound to substituted aromatic ring containing compound is about 1:4 or greater, and most preferably about 2:3 or greater. Preferably the ratio amount of peroxy containing compound to substituted aromatic ring containing compound is about 1:1 or less.

Preferably, the accelerator is located in the part that does not contain the organoboron compound. Often the part containing the organoboron compound is referred to as the hardener side, and the other part is referred to as the resin side because the largest part of the polymerizable compound is found in this part. Hydrocarbyl as used herein means any moiety having both carbon and hydrogen atoms and includes saturated and unsaturated, branched and unbranched, hydrocarbon chains. Alkyl refers to branched and unbranched saturated hydrocarbon chains. Alkenyl refers to branched and unbranched unsaturated hydrocarbon chains. Aryl means an aromatic hydrocarbon moiety. Alkaryl means an aromatic hydrocarbon moiety with a straight or branched hydrocarbon chain attached. Aralkyl means a straight or branched hydrocarbon chain with an aryl group attached. Acyl means a hydrocarbyl and carbonyl moiety. Unless otherwise stated these moieties may be substituted with any other substituent which does not significantly interfere in the function of the compound to which the moiety is attached or bonded.

The two-part polymerizable compositions or adhesive compositions of the invention are uniquely suited for use with conventional, commercially available dispensing equipment for two-part compositions. Once the two-parts have been combined, the composition should be used quickly, as the useful pot life (open time) may be short depending upon the monomer mix, the amount of complex, the amount of catalyst and the temperature at which the bonding is performed. The adhesive compositions of the invention are applied to one or both substrates and then the substrates are joined together, preferably with pressure to force excess composition out of the bond line. In general, the bonds should be made shortly after the composition has been applied, preferably within about 10 minutes. The typical bond line thickness is about 0.005 inches (0.13 mm) to about 0.03 inches (0.76 mm). The bond line can be thicker if gap filling is needed as the composition of the invention can function as both an adhesive and a gap filler. The bonding process can easily be carried out at room temperature and to improve the degree of bonding it is desirable to keep the temperature below about 40° C., preferably below about 30° C., and most preferably below about 25° C.

The compositions may further comprise a variety of optional additives. One particularly useful additive is a thickener such as medium to high (about 10,000 to about 1,000,000) molecular weight polymethyl methacrylate which may be incorporated in an amount of about 10 to about 60 weight percent, based on the total weight of the composition. Thickeners may be employed to increase the viscosity of the composition to facilitate application of the composition.

Another particularly useful additive is an elastomeric material. The materials may improve the fracture toughness of compositions made therewith which can be beneficial when, for example, bonding stiff, high yield strength materials such as metal substrates that do not mechanically absorb energy as easily as other materials, such as flexible polymeric substrates. Such additives can be incorporated in an amount of about 5 percent to about 35 percent by weight, based on the total weight of the composition. Useful elastomeric modifiers include chlorinated or chlorosulphonated polyethylenes such as HYPALON 30 (commercially available from E. I. Dupont de Nemours & Co., Wilmington, Del.) and block copolymers of styrene and conjugated dienes (commercially available from Dexco Polymers under the Trademark VECTOR, and Firestone under the Trademark STEREON). Also useful, and even more preferred, are certain graft copolymer resins such as particles that comprise rubber or rubber-like cores or networks that are surrounded by relatively hard shells, these materials often being referred to as "core-shell" polymers. Most preferred are the acrylonitrile-butadiene-styrene graft copolymers available from Rohm and Haas. In addition to improving the fracture toughness of the composition, core-shell polymers can also impart enhanced spreading and flow properties to the uncured composition. These enhanced properties may be manifested by a reduced tendency for the composition to leave an undesirable "string" upon dispensing from a syringe-type applicator, or sag or slump after having been applied to a vertical surface. Use of more than about 20 percent of a core-shell polymer additive is desirable for achieving improved sag-slump resistance. Generally the amount of toughening polymer used is that amount which gives the desired toughness to the polymer or the adhesive prepared.

In some embodiments where a heterocyclic ring opening compound is present and is an oxirane, it may desirable to include some aziridine containing compound in the formulation as the aziridine enhances the stability of the formulation. Generally, enough aziridine is added to improve the stability of the formulation. Preferably about 1 percent by weight or greater of aziridine based on the weight of the formulation is used and more preferably about 2 percent by weight or greater. Preferably about 10 percent by weight or less of aziridine based on the formulation weight is used and more preferably about 7 percent by weight or less is used.

Polymerizable compositions according to the invention may be used in wide variety of ways, including as adhesives, coatings, primers, to modify the surface of polymers, and injection molding resins. They may also be used as matrix resins in conjunction with glass and metal fiber mats such as in resin transfer molding operations. They may further be used as encapsulants and potting compounds such as in the manufacture of electrical components, printed circuit boards and the like. Quite desirably, they provide polymerizable adhesive compositions that can bond a wide range of substrates, including polymers, wood, ceramics, concrete, glass and primed metals. Another desirable related application is their use in promoting adhesion of paints to low surface energy substrates such as polyethylene, polypropylene, polyethyleneterephthalate, polyamides, and polytetrafluoroethylene, and their co-polymers. In this embodiment the composition is coated onto the surface of the substrate to modify the surface to enhance the adhesion of the final coating to the surface of the substrate.

The compositions of the invention can be used in coating applications. In such applications the composition may further comprise a carrier such as a solvent. The coating may further contain additives well known to those skilled in the art for use coatings, such as pigments to color the coating, inhibitors and UV stabilizers. The compositions may also be applied as powder coatings and may contain the additives well known to those skilled in the art for use in powder coatings.

The compositions of the invention can also be used to modify the surface of a polymeric molded part, extruded film or contoured object. Compositions of the invention can also be used to change the functionality of a polymer particle by surface grafting of polymer chains on to the unmodified plastic substrate.

Polymerizable compositions of the invention are especially useful for adhesively bonding low surface energy plastic or polymeric substrates that historically have been very difficult to bond without using complicated surface preparation techniques, priming, etc. By low surface energy substrates is meant materials that have a surface energy of about 45 mJ/m² or less, more preferably about 40 mJ/m² or less and most preferably about 35 mJ/m² or less. Included among such materials are polyethylene, polypropylene, acrylonitrile-butadiene-styrene, polyamides, syndiotactic polystyrene, olefin containing block co-polymers, and fluorinated polymers such as polytetrafluoroethlene (TEFLON) which has a surface energy of less than about 20 mJ/m². (The expression "surface energy" is often used synonymously with "critical wetting tension" by others.) Other polymers of somewhat higher surface energy that may be usefully bonded with the compositions of the invention include polycarbonate, polymethylmethacrylate, and polyvinylchloride.

The polymerizable compositions of the invention can be easily used as two-part adhesives. The components of the polymerizable compositions are blended as would normally be done when working with such materials. The decomplexing agent for the organoboron compound is usually included with the olefinic, polymerizable component so as to separate it from the organoboron compound, thus providing one-part of the two-part composition. The organoboron compounds of the polymerization initiator system provides the second part of the composition and is added to the first part shortly before it is desired to use the composition. Similarly, the Lewis acid catalyst where used for the heterocyclic ring opening compound polymerization is kept separate from the heterocyclic ring opening compound. The Lewis acid catalyst may be added to the first part directly or it may be pre-dissolved in an appropriate carrier such as a reactive olefinic monomer, i.e., methyl methacrylate or a MMA/PMMA viscous solution.

For a two-part adhesive such as those of the invention to be most easily used in commercial and industrial environments, the volume ratio at which the two-parts are combined should be a convenient whole number. This facilitates application of the adhesive with conventional, commercially available dispensers. Such dispensers are shown in U.S. Pat. Nos. 4,538,920 and 5,082,147 (incorporated herein by reference) and are available from Conprotec, Inc. (Salem, N.J.) under the trade name MIXPAC. Typically, these dispensers use a pair of tubular receptacles arranged side-by-side with each tube being intended to receive one of the two-parts of the adhesive. Two plungers, one for each tube, are simultaneously advanced (e.g., manually or by a hand-actuated ratcheting mechanism) to evacuate the contents of the tubes into a common, hollow, elongated mixing chamber that may also contain a static mixer to facilitate blending of the two-parts. The blended adhesive is extruded from the mixing chamber onto a substrate. Once the tubes have been emptied, they can be replaced with fresh tubes and the application process continued. The ratio at which the two-parts of the adhesive are combined is controlled by the diameter of the tubes. (Each plunger is sized to be received within a tube of fixed diameter, and the plungers are advanced into the tubes at the same speed.) A single dispenser is often intended for use with a variety of different two-part adhesives and the plungers are sized to deliver the two-parts of the adhesive at a convenient mix ratio. Some common mix ratios are 1:1, 2:1, 4:1 and 10:1, but preferably less than about 10:1 and more preferably less than about 4:1.

Preferably, the mixed two-part compositions of the invention have a suitable viscosity to allow application without dripping. Preferably, the viscosities of the two individual components should be of the same order or magnitude. Preferably, the mixed compositions have the viscosity of about 100 (0.1 Pa·S) centipoise or greater, more preferably about 1,000 (1.0 Pa·S) centipoise or greater and most preferably about 5,000 (5.0 Pa·S) centipoise or greater. Preferably the adhesive compositions have a viscosity of about 150,000 (150 Pa·S) centipoise or less, more preferably about 100,000 (100 Pa·S) centipoise or less and most preferably about 50,000 (50 Pa·S) centipoise or less.

Specific Embodiments

The following examples are included for illustrative purposes only and are not intended to limit the scope of the claims. Unless otherwise stated all parts and percentages are by weight.

Ingredients

The following ingredients were used in the examples provided hereinafter:
methyl methacrylate available from Rohm and Haas;
poly(methylmethacrylate) 350,000 mw available from Aldrich;
poly(methylmethacrylate) 996,000 mw available from Aldrich;
fumed silica available from Cabot Corporation under the trademark and designation
Cab-o-sil™ TS-720;
Acrylic acid available from Sigma Aldrich;
Hypalon™ 20 chlorosulfonated polyethylene available from Dupont-Dow Elastomers;
Scotchlite™ VS5500 glass bubbles available from 3M;
Methyl ether of hydroquinone available from Sigma Aldrich (MEHQ);
t-butyl peroxybenzoate available from Aztec Peroxides Inc.;
Methacrylic acid available from Sigma Aldrich;
Benzoquinone available from Aldrich; and
Complex of tri-n-butyl borane and methoxypropyl amine.

Two part formulations were prepared by mixing the ingredients for each part and then placed in separate containers. Several different part A (resin side) formulations were made.

Process for Preparing Resin Side Containing Benzoquinone as Accelerator

The following ingredients are added to a 1 gallon (3.79 liters) metal can and rolled on a ball roll mill for 24 to 72 hours. The ingredients are 150 grams of methyl methacrylate, 45 grams of polymethyl methacrylate (350,000 mw), 9 grams of polymethyl methacryalte (996,000 mw) and 15 grams of chlorosulfonated polyethylene. 146 grams of the blended ingredients are added to an 8 oz. (236 mL) plastic cup to which is added 33.99 grams or methyl methacrylate and 0.024 grams of methyl ether of hydroquinone. The ingredients are completely mixed by hand using a tongue depressor for 3 minutes. Four grams of glass bubbles and 4 grams of fumed silica are added and the ingredients are completely mixed by hand using a tongue depressor for 3 minutes. Twenty four grams of acrylic acid are added and the ingredients are completely mixed by hand using a tongue depressor for 3 minutes. Up to 0.096 grams or benzoquinone are added and the ingredients are completely mixed by hand using a tongue depressor for 3 minutes. The resulting mixture is packaged in an 8 oz. (236 mL) plastic cup.

Process for Preparing Resin Side Containing Methyl Ether of Hydroquinone

The following ingredients are added to a 1 gallon metal can and rolled on a ball roll mill for 24 to 72 hours. The ingredients are 150 grams of methyl methacrylate, 45 grams of polymethyl methacrylate (350,000 mw), 9 grams of polymethyl methacrylate (996,000 mw) and 15 grams of chlorosulfonated polyethylene. 146 grams of the blended ingredients are added to a 8 oz. (236 mL) plastic cup to which is added 33.99 grams of methyl methacrylate and 4 grams of methyl ether of hydroquinone. The ingredients are completely mixed by hand using a tongue depressor for 3 minutes.

Four grams of glass bubbles and 4 grams of fumed silica are added and the ingredients are completely mixed by hand using a tongue depressor for 3 minutes. Twenty eight grams of acrylic acid are added and the ingredients are completely mixed by hand using a tongue depressor for 3 minutes. Four grams of t-butyl peroxy-benzoate are added and the ingredients are completely mixed by hand using a tongue depressor for 3 minutes. The resulting mixture is packaged in an 8 oz. (236 mL) plastic cup.

Part B Hardener

Part B (hardener side) comprised 15 percent of a tri-n-butyl borane-methoxy propyl amine complex, 8.0 percent of Jeffamine T403 amine terminated polyether polyol, 54 percent of methyl methacrylate, 15 percent of poly(methylmethacrylate), 7 percent of poly(methyl methacrylate) polyacrylate copolymer and a stabilizer as listed below.

Several Part A formulations were prepared using the procedures described above. The formulations are described below in Table 1.

TABLE 1

| Ingredient | Example | | | | | | | |
|---|---|---|---|---|---|---|---|---|
| | 1 (g) | 2 (g) | 3 (g) | 4 (g) | 5 (g) | 6 (g) | 7 (g) | 8 (g) |
| Resin Blend | 200 | 200 | 50 | 50 | 50 | 50 | 50 | 50 |
| Acrylic Acid | 8 | 8 | 2 | | | | | 2 |
| MEHQ | 4 | 4 | | 1 | | | 1 | |
| Methacrylic Acid | | | | | 2 | | 2 | |
| Methyl Methacrylate | | | | | | 3.5 | 3.5 | 3.497 |
| Benzoquinone | | | | | | | | .024 |
| t-butyl peroxybenzoate | 4 | 4 | 00 | 00 | 00 | 00 | 00 | 00 |
| Total | 216 | 216 | 52 | 51 | 52 | 53.5 | 58.5 | 53.521 |

Adhesives as described above were tested for Lap shear strength according to ASTM D3165-91 on the substrates listed below at several times from application as listed below. The surface area covered and overlapping was 1 inch (254 cm) wide by ½ inch (1.27 cm) long. The bond thickness of 30 mil (0.76 mm) was maintained using 30 mil (0.76 mm) glass beads. The samples were pulled on an Instron 5500 at a rate of 0.5 inches (1.27 cm) per minute until failure and the stress at failure were recorded in pounds per square inch. The results are compiled in Table 2 below. The surfaces of the substrates were not pretreated. The samples were cured and tested at room temperature (about 23° C.). The polypropylene substrate was 30 percent glass filled polypropylene. Relative to the mode of failure: Cohesive failure means that the break occurred in the adhesive;

Adhesive failure means the adhesive pulled away from the substrate; and substrate means the substrate broke.

TABLE 2

| Example | Substrate | Cure time hour | Failure Mode | Strength PSI | (kPa) |
|---|---|---|---|---|---|
| 1 | Polypropylene | 0.5 | Cohesive | 0 | (0) |
| 1 | Polypropylene | 1 | Cohesive | 15 | (103) |
| 1 | Polypropylene | 2 | Adhesive | 359 | (2475) |
| 1 | Polypropylene | 3 | Adhesive | 678 | (4675) |
| 1 | Polypropylene | 5 | Substrate | 829 | (5716) |
| 2 | e-coat | 0.5 | Adhesive | 2 | (14) |
| 2 | e-coat | 1 | Adhesive | 11 | (76) |

TABLE 2-continued

| Example | Substrate | Cure time hour | Failure Mode | Strength PSI | (kPa) |
|---|---|---|---|---|---|
| 2 | e-coat | 2 | Cohesive | 37 | (255) |
| 2 | e-coat | 3 | Cohesive | 237 | (1634) |
| 2 | e-coat | 5 | Cohesive | 1082 | (7460) |
| 2 | e-coat | 24 | Cohesive | 2664 | (18370) |
| 2 | e-coat | 24 | Cohesive | 2848 | (19630) |
| 2 | e-coat | 24 | Cohesive | 3253 | (22420) |
| 2 | e-coat | 24 | Cohesive | 2598 | (17910) |
| 2 | e-coat | 24 | Cohesive | 2664 | (18370) |
| 2 | Polypropylene | 24 | Substrate | 1170 | (8066) |
| 2 | Polypropylene | 24 | Substrate | 1172 | (8081) |
| 2 | Polypropylene | 24 | Substrate | 1031 | (7108) |
| 2 | Polypropylene | 24 | Substrate | 984 | (6784) |
| 2 | Polypropylene | 24 | Substrate | 1001 | (6902) |
| 3 | e-coat | .5 | Cohesive | 0 | (0) |
| 3 | e-coat | 1 | Cohesive | 4 | (28) |
| 3 | e-coat | 2 | Cohesive | 6 | (41) |
| 3 | e-coat | 3 | Cohesive | 18 | (124) |
| 3 | e-coat | 5 | Cohesive | 52 | (359) |
| 3 | e-coat | 24 | Cohesive | 1936 | (13350) |
| 3 | e-coat | 24 | Cohesive | 1717 | (11840) |
| 3 | e-coat | 24 | Cohesive | 1701 | (11730) |
| 3 | Polypropylene | 24 | Substrate | 930 | (6412) |
| 3 | Polypropylene | 24 | Substrate | 1000 | (6894) |
| 3 | Polypropylene | 24 | Substrate | 1004 | (6922) |
| 4 | e-coat | 0.5 | Cohesive | 5 | (34) |
| 4 | e-coat | 1 | Cohesive | 5 | (34) |
| 4 | e-coat | 2 | Cohesive | 12 | (83) |
| 4 | e-coat | 3 | Cohesive | 26 | (179) |
| 4 | e-coat | 5 | Cohesive | 164 | (1130) |
| 4 | e-coat | 24 | Cohesive | 2156 | (14870) |
| 4 | e-coat | 24 | Cohesive | 2030 | (14000) |
| 4 | e-coat | 24 | Cohesive | 1338 | (9225) |
| 4 | Polypropylene | 24 | Substrate | 1121 | (7729) |
| 4 | Polypropylene | 24 | Substrate | 825 | (5688) |
| 4 | Polypropylene | 24 | Substrate | 971 | (6695) |
| 5 | e-coat | 0.5 | Cohesive | 3 | (21) |
| 5 | e-coat | 1 | Cohesive | 5 | (34) |
| 5 | e-coat | 2 | Cohesive | 14 | (97) |
| 5 | e-coat | 3 | Cohesive | 46 | (317) |
| 5 | e-coat | 5 | Cohesive | 120 | (827) |
| 5 | e-coat | 24 | Cohesive | 1662 | (11460) |
| 5 | e-coat | 24 | Cohesive | 1828 | (12600) |
| 5 | e-coat | 24 | Cohesive | 1571 | (10830) |
| 5 | Polypropylene | 24 | Substrate | 748 | (5157) |
| 5 | Polypropylene | 24 | Substrate | 909 | (6267) |
| 5 | Polypropylene | 24 | Substrate | 806 | (5557) |
| 6 | e-coat | 0.5 | Cohesive | 3 | (21) |
| 6 | e-coat | 1 | Cohesive | 7 | (48) |
| 6 | e-coat | 2 | Cohesive | 18 | (124) |
| 6 | e-coat | 3 | Cohesive | 38 | (262) |
| 6 | e-coat | 5 | Cohesive | 138 | (951) |
| 6 | e-coat | 24 | Cohesive | 1748 | (12050) |
| 6 | e-coat | 24 | Cohesive | 1621 | (11180) |
| 6 | e-coat | 24 | Cohesive | 1476 | (10180) |
| 6 | Polypropylene | 24 | Substrate | 1058 | (7226) |
| 6 | Polypropylene | 24 | Substrate | 844 | (5819) |
| 6 | Polypropylene | 24 | Substrate | 1049 | (7233) |
| 7 | e-coat | 0.5 | Cohesive | 2 | (14) |
| 7 | e-coat | 1 | Cohesive | 6 | (41) |
| 7 | e-coat | 2 | Cohesive | 15 | (103) |
| 7 | e-coat | 3 | Cohesive | 40 | (276) |
| 7 | e-coat | 5 | Cohesive | 198 | (1365) |
| 7 | e-coat | 24 | Cohesive | 1715 | (11830) |
| 7 | e-coat | 24 | Cohesive | 1919 | (13230) |
| 7 | e-coat | 24 | Cohesive | 1952 | (13460) |
| 7 | Polypropylene | 24 | Substrate | 980 | (6757) |
| 7 | Polypropylene | 24 | Substrate | 1013 | (6984) |
| 7 | Polypropylene | 24 | Substrate | 1005 | (6929) |
| 8 | e-coat | 24 | Cohesive | 2712 | (18700) |
| 8 | e-coat | 24 | Cohesive | 3349 | (23090) |
| 8 | e-coat | 24 | Cohesive | 2339 | (16130) |
| 8 | e-coat | 24 | Cohesive | 2918 | (20120) |
| 8 | e-coat | 24 | Cohesive | 3206 | (22110) |
| 8 | Polypropylene | 1 | Adhesive | 5 | (34) |
| 8 | Polypropylene | 2 | Adhesive | 62 | (427) |
| 8 | Polypropylene | 3 | Adhesive | 713 | (4916) |
| 8 | Polypropylene | 5 | Substrate | 721 | (4971) |

TABLE 2-continued

| Example | Substrate | Cure time hour | Failure Mode | Strength PSI | (kPa) |
|---|---|---|---|---|---|
| 8 | Polypropylene | 24 | Substrate | 703 | (4847) |
| 8 | Polypropylene | 24 | Substrate | 723 | (4985) |
| 8 | Polypropylene | 24 | Substrate | 746 | (5143) |
| 8 | Polypropylene | 24 | Substrate | 751 | (5478) |
| 8 | Polypropylene | 24 | Substrate | 721 | (4971) |

The examples illustrate the use of the oxidized bis(hydrogenated tallow alkyl) amines enhances the stability of other types of stabilizers. This situation is true whether used in a blend or alone.

What is claimed is:

1. A method of polymerization comprising contacting the components of a polymerizable composition comprising in one part an organoboron compound comprising an organoboron amine complex and in the second part one or more compounds capable of free radical polymerization and a cure accelerator comprising (a) at least one substituted or unsubstituted benzoquinone present in an amount of about 0.02 to about 0.4 percent by weight of the two part composition and a decomplexing agent capable of decomplexing the organoboron amine complex upon contacting of the two parts, wherein the cure accelerator is located only in the second part and wherein the parts of the composition prior to contacting of the two parts exhibit a viscosity increase of less than 150 percent over 30 days when stored at 40° C. or less and the polymerizable composition exhibits a lap shear strength according to ASTM 03165-91 of 50 psi or greater 2 hours after contacting and application to a polypropylene substrate:
wherein:
the organoboron compounds comprise a complex of trialkyl borane and a compound having a primary amine and one or more hydrogen accepting grows, wherein the one or more hydrogen bond accepting groups is selected from ether or polyether, and there are at least two carbon atoms between primary amine and the hydrogen bond accepting groups, wherein the compound having a primary amine and one or more hydrogen accepting groups is selected from the group of consisting of methoxypropylamine, methoxybutylamine, methoxyethylamine, ethoxypropylamine, propoxypropylamine, and amine terminated polyalkylene ethers: and
the compounds capable of free radical polymerization comprise acrylate or methacrylate monomers, polymers or a mixture thereof.

2. The method of claim 1 wherein the contacting occurs at, or near, ambient temperature.

3. A method of bonding two or more substrates together which comprises:
contacting the components of a composition, comprising in one part an organoboron compound comprising an organoboron amine complex and in the second part one or more compounds capable of free radical polymerization and a cure accelerator comprising (a) one or more substituted or unsubstituted benzoquinones present in an amount of about 0.02 to about 0.4 percent by weight of the two part composition and a decomplexing agent capable of decomplexing the organoboron amine complex upon contacting of the two parts, wherein the cure accelerator is located only in the second part and under conditions such that polymerization is initiated
contacting the contacted composition with the two or more substrates;
positioning the two or more substrates such that the contacted composition is located between the two or more substrates wherein they are in contact with one another; and
allowing the contacted composition to cure so as to bind the two or more substrates together:
wherein the parts of the composition prior to contacting of the two parts exhibit a viscosity increase of less than 150 percent over 30 days when stored at 40° C. or less and the composition exhibits a lap shear strength according to ASTM 03165-91 of 50 psi or greater 2 hours after application to a polypropylene substrates:
wherein:
the organoboron compounds comprise a complex of trialkyl borane and a compound having a primary amine and one or more hydrogen accepting groups, wherein the one or more hydrogen bond accepting groups is selected from ether or polyether, and there are at least two carbon atoms between primary amine and the hydrogen bond accepting groups, wherein the compound having a primary amine and one or more hydrogen accepting groups is selected from the group of consisting of methoxypropylamine, methoxybutylamine, methoxyethylamine, ethoxypropylamine, propoxypropylamine and amine terminated polyalkylene ethers; and
the compounds capable of free radical polymerization comprise acrylate or methacrylate monomers, polymers or a mixture thereof.

4. A method of bonding two or more substrates according to claim 3 which further comprises heating the composition to a temperature such that the organoboron amine complex disassociates.

5. A method of coating a substrate which comprises contacting the components of a composition comprising in one part an organoboron compound comprising an organoboron amine complex and in the second part one or more compounds capable of free radical polymerization and a cure accelerator comprising (a) at least one substituted or unsubstituted benzoquinone present in an amount of about 0.02 to about 0.4 percent by weight of the two part composition and a decomplexing agent capable of decomplexing the organoboron amine complex upon contacting of the two parts, wherein the cure accelerator is located only in the second part and; contacting the contacted composition with one or more surfaces of a substrate; and allowing the contacted composition on the substrate to cure; and
wherein the parts of the composition prior to contacting of the two parts exhibit a viscosity increase of less than 150 percent over 30 days when stored at 40° C. or less and the composition exhibits a lap shear strength according to ASTM 03165-91 of 50 psi or greater 2 hours after application to a polypropylene substrate:
wherein:
the organoboron compounds comprise a complex of trialkyl borane and a compound having a primary amine and one or more hydrogen accepting groups, wherein the one or more hydrogen bond accepting groups is selected from ether or polyether, and there are at least two carbon atoms between primary amine and the hydrogen bond accepting groups, wherein the compound having a primary amine and one or more hydrogen accepting groups is selected from the group of consisting of methoxypropylamine, methoxybutylamine, methoxyethylamine, ethoxypropylamine, propoxypropylamine, and amine terminated polyalkylene ethers; and the compounds capable of free radical polymerization comprise acrylate or methacrylate monomers, polymers or a mixture thereof.

6. A method according to claim 1 wherein the first part further comprises one or more compounds capable of free radical polymerization selected from acrylate or methacrylate monomers, polymers and mixtures thereof.

7. A method according to claim 3 wherein the first part further comprises one or more compounds capable of free radical polymerization selected from acrylate or methacrylate monomers, polymers and mixtures thereof.

8. A method according to claim 1 wherein the decomplexing agent comprises an acid.

9. A method according to claim 3 wherein the decomplexing agent comprises an acid.

10. A method according to claim 5 wherein the decomplexing agent comprises an acid.

11. A method according to claim 5 wherein the first part further comprises one or more compounds capable of free radical polymerization selected from acrylate or methacrylate monomers, polymers and mixtures thereof.

* * * * *

UNITED STATES PATENT AND TRADEMARK OFFICE
CERTIFICATE OF CORRECTION

| | | |
|---|---|---|
| PATENT NO. | : 8,114,947 B2 | Page 1 of 1 |
| APPLICATION NO. | : 11/861616 | |
| DATED | : February 14, 2012 | |
| INVENTOR(S) | : Gary L. Jialanella et al. | |

It is certified that error appears in the above-identified patent and that said Letters Patent is hereby corrected as shown below:

In Col. 21, line 37
replace "grows"
with "groups."

Signed and Sealed this
Twenty-seventh Day of March, 2012

David J. Kappos
*Director of the United States Patent and Trademark Office*